(12) United States Patent
Moon et al.

(10) Patent No.: US 8,325,982 B1
(45) Date of Patent: Dec. 4, 2012

(54) METHOD AND SYSTEM FOR DETECTING AND TRACKING SHOPPING CARTS FROM VIDEOS

(75) Inventors: Hankyu Moon, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 677 days.

(21) Appl. No.: 12/460,818

(22) Filed: Jul. 23, 2009

(51) Int. Cl.
*G06K 9/00* (2006.01)
*H04N 5/225* (2006.01)
(52) U.S. Cl. .................... 382/103; 348/169
(58) Field of Classification Search .......... 382/103, 382/104, 107, 236; 348/169, 170, 171, 172, 348/285.1, 208.2, 208.14, 352, 94, 154, 155, 348/208.1, 208.16, 347
See application file for complete search history.

(56) References Cited

U.S. PATENT DOCUMENTS

| | | | | |
|---|---|---|---|---|
| 6,659,344 B2* | 12/2003 | Otto et al. | | 235/381 |
| 7,646,887 B2* | 1/2010 | Goncalves et al. | | 382/103 |
| 7,801,330 B2* | 9/2010 | Zhang et al. | | 382/103 |
| 2005/0072651 A1* | 4/2005 | Wieth et al. | | 194/205 |
| 2008/0042836 A1 | 2/2008 | Christopher | | |

OTHER PUBLICATIONS

J. Sklansky, "Measuring Concavity on a Rectangular Mosaic," IEEE Transactions on Computers, vol. c-21, No. 12, Dec. 1972.

* cited by examiner

*Primary Examiner* — Abolfazl Tabatabai

(57) ABSTRACT

The present invention is a method and system for detecting and tracking shopping carts from video images in a retail environment. First, motion blobs are detected and tracked from the video frames. Then these motion blobs are examined to determine whether or not some of them contain carts, based on the presence or absence of linear edge motion. Linear edges are detected within consecutive video frames, and their estimated motions vote for the presence of a cart. The motion blobs receiving enough votes are classified as cart candidate blobs. A more elaborate model of passive motions within blobs containing a cart is constructed. The detected cart candidate blob is then analyzed based on the constructed passive object motion model to verify whether or not the blob indeed shows the characteristic passive motion of a person pushing a cart. Then the finally-detected carts are corresponded across the video frames to generate cart tracks.

16 Claims, 15 Drawing Sheets

METHOD AND SYSTEM FOR DETECTING AND TRACKING SHOPPING CARTS FROM VIDEOS

BACKGROUND OF THE INVENTION

1. Field of the Invention

The present invention is a method and system to detect and track shopping carts from video images in a retail environment.

2. Background of the Invention

Video analytics in the field of retail marketing provides a wealth of information from video images collected from cameras placed in stores. The analysis mostly concerns how shoppers navigate the stores and make purchase decisions. In-store shopper behavior can be summarized in one way by their tracks in stores—which aisles they visit and how much time they spend in different product categories. Current state-of-the-art video processing technology can track customers throughout the store and generate tracking data.

In many of the stores, shopping is aided by shopping carts. From the viewpoint of video analysis technology, the presence of shopping carts can be a nuisance; shopping carts often confuse an automatic tracking algorithm, causing it to detect and track carts as shoppers. On the other hand, the shopping carts may provide additional valuable marketing information, because the trajectory of a cart effectively summarizes the shopping trip of a person or a group. Especially when shoppers come in groups, the track of a shopping cart may reveal very informative clues about the shopping trip, while tracks of some group members (such as children) can be less significant.

Many video-based surveillance and monitoring technologies utilize motion information to find and track objects of interest—such as humans, vehicles, etc. Motion-based object detection/tracking has been successfully and extensively used due to its simplicity and efficiency. For in-store video analytics, the presence of shopping carts poses challenges under this framework; because shopping carts move in the same manner as the shoppers who are pushing the carts, a shopper using a cart may be confused as a group of people. Such errors will corrupt the automatically-generated shopping behavior data.

The present invention addresses such issue in automatic retail video analytics—the problem of differentiating carts from groups of people—so that carts can be detected and tracked. The present invention takes advantage of the distinct motion features of a person pushing a cart that are different from the motions within a group of people. The motion of a cart is initiated by the person pushing (or pulling, in some cases) it; because a cart is a passive object, it moves only whenever a person moves it. The first step is to find any regions in a video frame that are moving. The object of interest—a cart—always belongs to a shopper when it is in motion, and the person pushing a cart often generates a single motion blob larger than a person. In a retail environment, a large motion blob detected from a view of the store floor contains either a shopper (or shoppers) with a cart or just multiple shoppers without carts. Whenever a motion blob is found that is of a size large enough to contain a person with a cart, the system examines whether or not the blob contains a cart. First, linear motion edges are found and tracked; the linear motion edges are the characteristic image features of a moving cart. If the positions and motions of these linear edges match the characteristic motion of a cart, then the motion blob is further considered as a serious candidate for a "cart candidate blob"—a blob containing a person (or more than one person) and a cart. Further steps of extracting relative motion features within the candidate blobs and comparing the extracted motion features to a model of characteristic motions of a cart blob finally determine whether or not the candidate blob indeed contains a cart. The system keeps updated positions of the detected carts so that they are individually tracked.

There have been prior attempts for tracking the motion of carts or baskets for the purpose of understanding shoppers' behaviors.

U.S. Pat. No. 6,659,344 of Otto, et al. (hereinafter Otto) presents a shopper behavior monitoring system using RFID tags attached to products and RFID scanners installed in shopping baskets, so that the system can detect product purchase at the shelf and identify the purchase items. In U.S. Pat. Appl. Pub. No. 2008/0042836 of Christopher (hereinafter Christopher), the RFID system is used to track shopping carts throughout the store. The present invention utilizes video cameras to detect carts and generate their trajectories without using any costly and cumbersome devices. The motion blob detection and tracking utilizes a method similar to "Measuring concavity on a rectangular mosaic", IEEE Transaction on Computers, Volume 21, by Sklansky (hereinafter Sklansky).

In summary, the present invention provides an approach to detect and track carts in retail environments. Unlike some of the prior inventions, the present invention does not require any specialized device to detect and track shopping carts. The present invention takes advantage of the rigid motion signature of a shopping cart in motion, and also the relation between the motion of the cart and the motion of the shopper pushing the cart.

SUMMARY

The present invention is a method and system to detect and track shopping carts from video images in a retail environment.

It is one of the objectives of the first step of the process to detect and track motion blobs from video images. First, motion foreground segmentation is performed to find pixels that go through motion. Motion blobs are constructed by grouping together detected motion foreground pixels that are in close proximity. The detected motion blobs are corresponded between consecutive frames, so that their motions can be estimated. This step generates both a set of motion blobs and their individual motion vectors.

It is one of the objectives of the second step of the processing to detect the presence of carts from the detected motion blobs. First, linear edges are detected from the current video frame. Linear edges are also detected from the next video frame, and they are corresponded to the detected linear edges from the current frame. Based on the locations and motions of the estimated motion blobs, hypothetical cart shape models are generated. The estimated motion vectors of the detected linear motion edges vote for each of the cart position and orientation models. The motion blobs receiving enough evidence from the voting are chosen as cart candidate blobs.

It is one of the objectives of the third step of the processing to construct the model of motion features of cart blobs. Passive motion features of carts are extracted first. In one of the exemplary embodiments, the histogram of the motion field within the cart candidate blob serves as passive motion features. Then statistics of such histograms are estimated for both the motion blobs that contain carts and the motion blobs that only contain humans. The statistics serve as a passive object motion model.

It is one of the objectives of the fourth step of the processing to verify the presence of carts within the detected cart candidate blobs based on the constructed model of the motion features of the cart blobs. The within-blob motion features are extracted from the cart candidate blobs. Then the motion features are compared to the passive object motion model to determine whether or not the given within-blob motion features match the passive object motion model. This step effectively detects a cart within a motion blob.

It is one of the objectives of the fifth step of the processing to track the detected carts. The detected carts are corresponded across the video frames by maintaining a list of cart tracks. Whenever new carts are detected, the tracker compares these carts against the list of cart tracks to find matches based on the position and the orientation of each of the new carts and the position and the orientation of the last cart from each of the tracks. When the tracker is not able to find a good match for some of the newly-detected carts, it generates new tracks for these carts. Whenever a cart track is dormant (not being assigned a new cart) for a certain amount of time, the cart track is terminated.

DRAWINGS

Figures

DETAILED DESCRIPTION OF THE INVENTION

Figure 1:
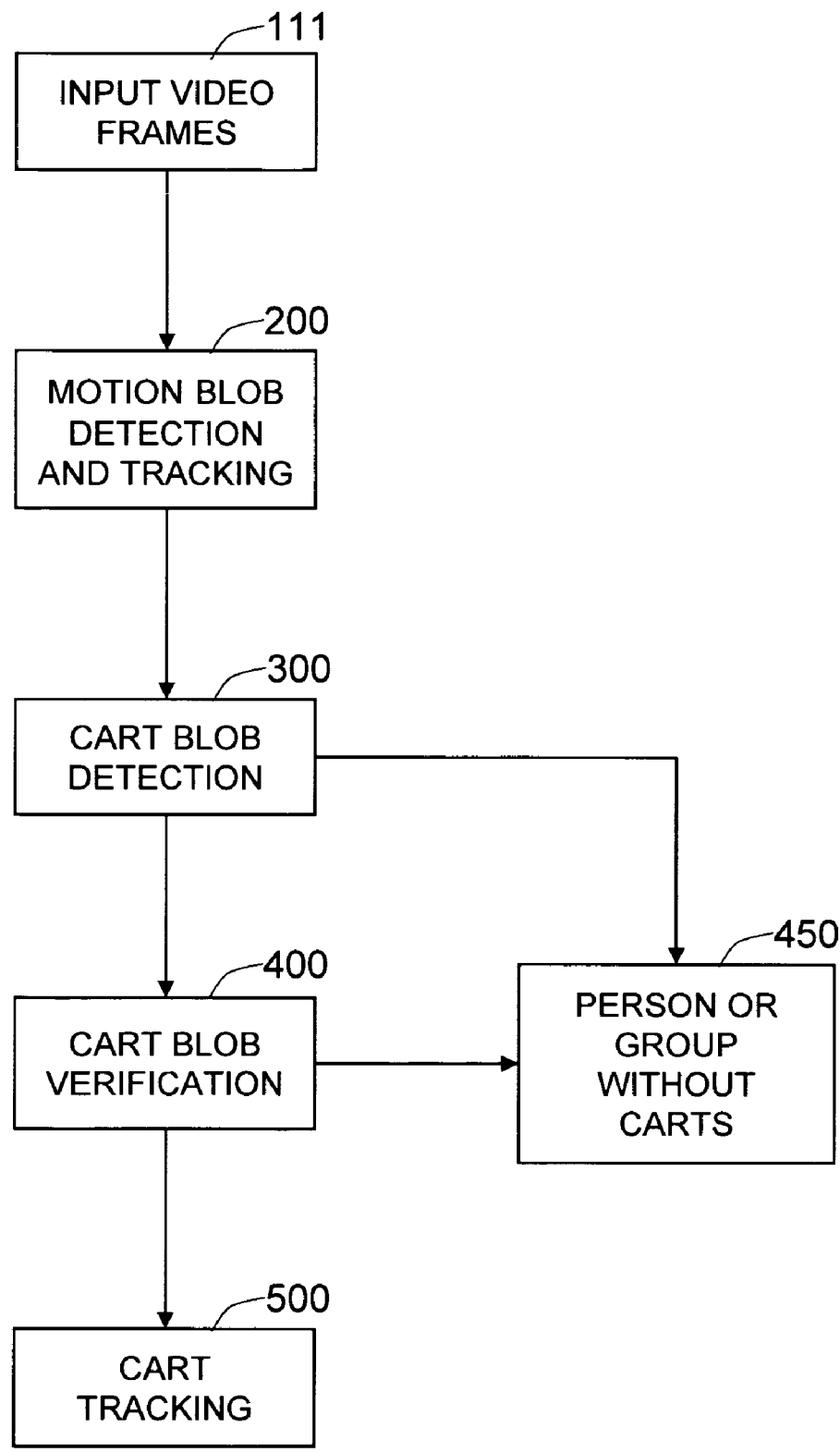
FIG. 1 is an overall scheme of the system in a preferred embodiment of the invention.

FIG. 1 is an overall scheme of the system in a preferred embodiment of the invention. Given the input video frames 111, the motion blob detection and tracking 200 step finds any pixels that potentially constitute objects in motion, aggregates them into some number of blobs, and estimates their motions. The motion blobs 226 detected from the retail floor usually contain either shoppers pushing shopping carts or shoppers (or shoppers in groups) without pushing shopping carts. Then the cart blob detection 300 step takes advantage of the characteristic motion information from the cart to detect motion blobs that are likely to contain carts among the detected motion blobs. In one of the exemplary embodiments, coherent motion of linear edges constitutes the characteristic motion of the carts. The cart blob verification 400 step derives motion features of relative motions within the motion blobs that potentially contain carts. In one of the exemplary embodiments, the histogram of motion (of points within the motion blob) relative to the dominant motion of the blob constitutes the within-blob motion features 415. These two steps effectively differentiate shoppers pushing carts from individual shoppers or groups of shoppers who do not have carts 450. Then the finally-detected cart blobs are individually tracked in the cart tracking 500 step, so that the tracks of the carts can be utilized for further shopper behavior analysis.

Figure 2:
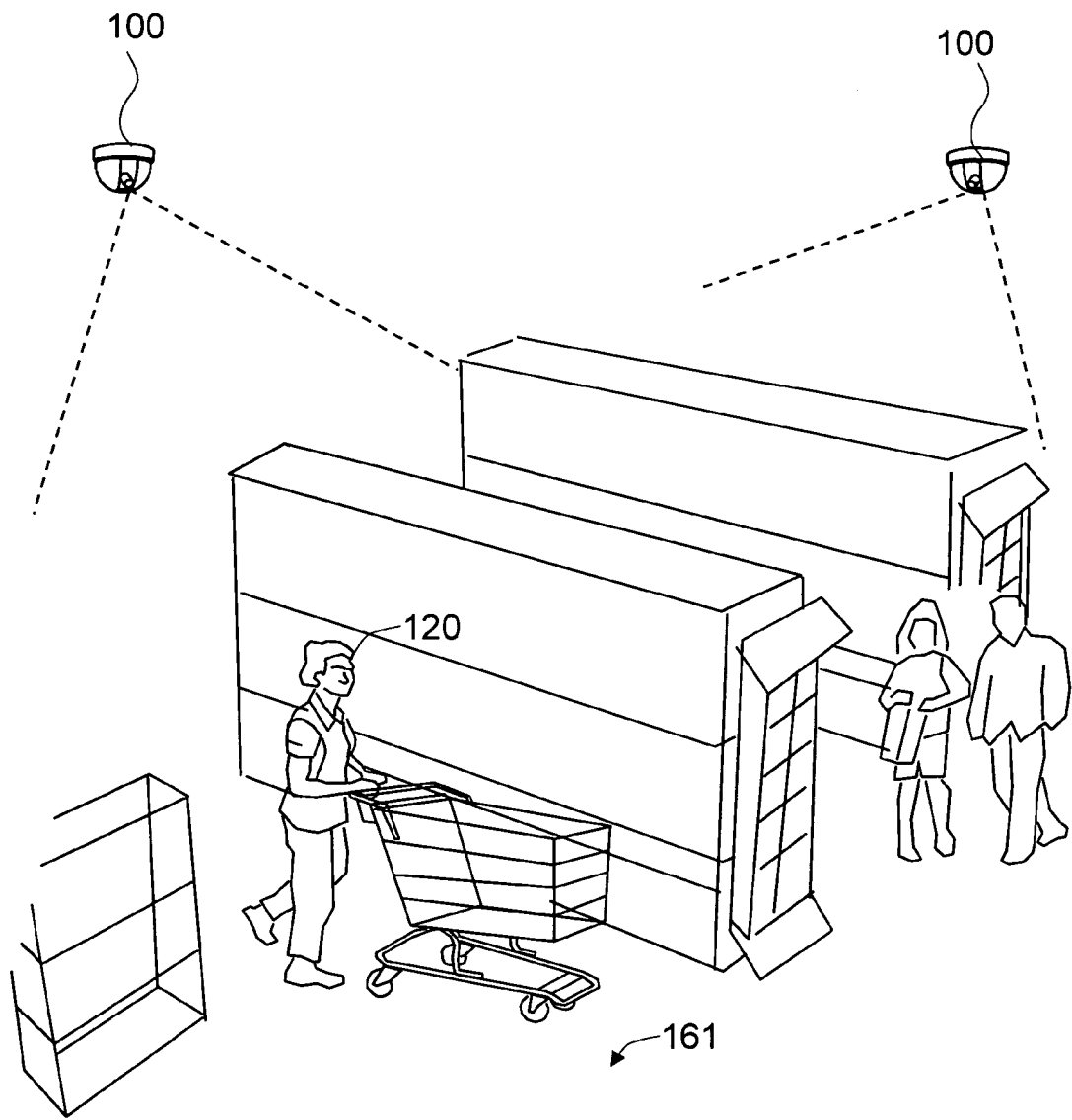
FIG. 2 shows a view of the system of the invention in an operational environment in an exemplary embodiment.

FIG. 2 shows a view of the system of the invention in an operational environment in an exemplary embodiment. Each shopper 120 browses through the store aisles 161, looking for items to purchase. Shoppers shop individually or in groups. Some of them push carts to aid their shopping. The means for capturing images 100 capture the view of the shoppers within each field-of-view. The system then processes the captured video frames to identify regions in image frames that contain shoppers and/or carts, and determine whether the given region contains carts. The system of the invention tracks the detected carts individually to generate cart tracks for further analysis.

Figure 3:
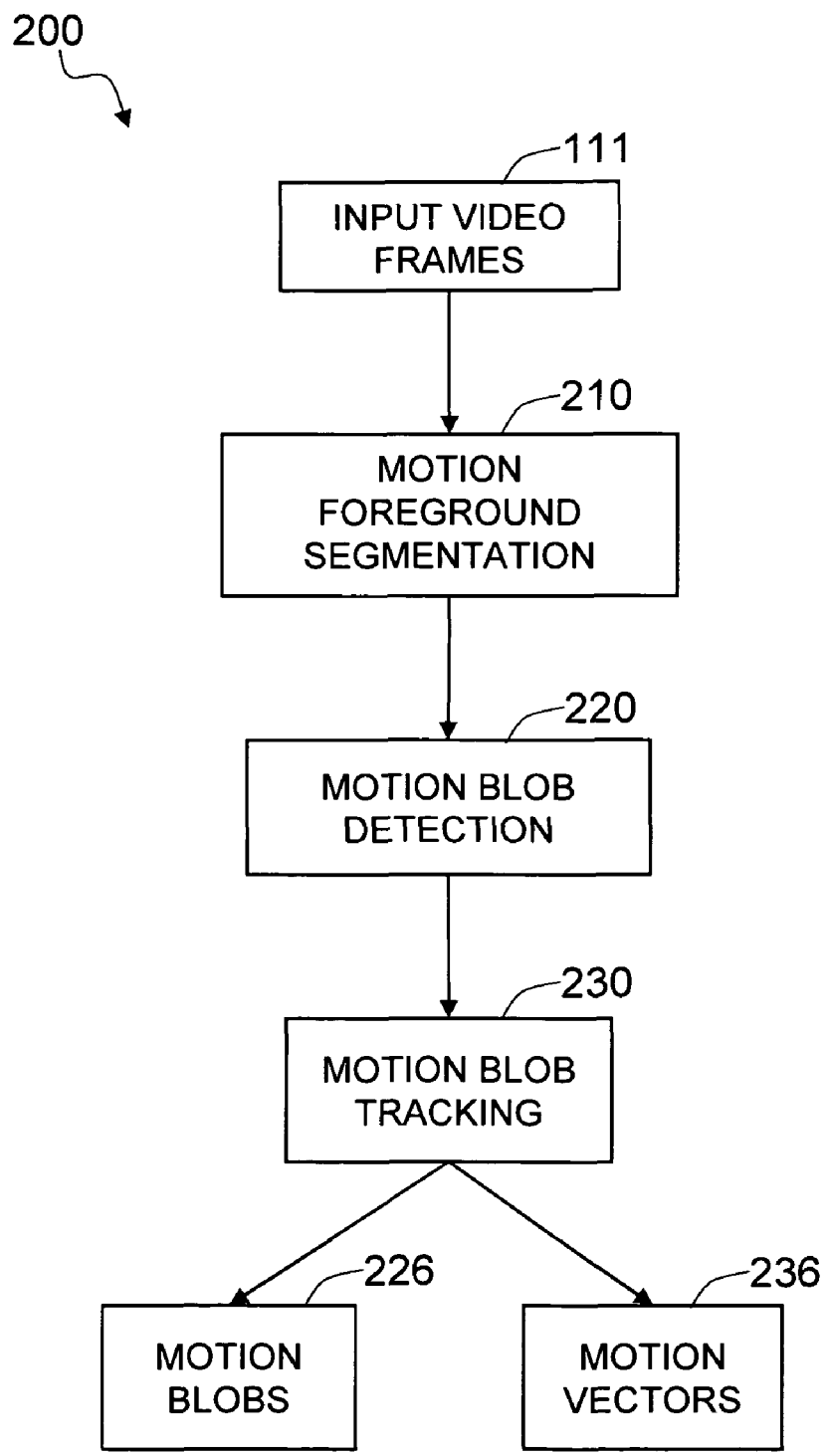
FIG. 3 shows an exemplary embodiment of the motion blob detection and tracking step.

FIG. 3 shows an exemplary embodiment of the motion blob detection and tracking 200 step. The input video frames 111 are processed by the motion foreground segmentation 210 step to find pixels that potentially constitute objects in motion. In an exemplary embodiment, the step collects statistics of each pixel over some period of time to model the intensity changes of pixels that are not in motion. Then any changes of pixel values at a given pixel position are compared against the collected statistics to determine whether or not the changes constitute a motion. The motion foreground is the set of pixels that are classified as motion pixels in such a way. Then the motion blob detection 220 step groups together motion foreground pixels so that a motion blob contains shoppers or shoppers with carts. The step will group together motion foreground pixels that are in proximity and in enough numbers (a predetermined threshold). In one of the exemplary embodiments, the step utilizes Sklansky's algorithm to find a convex hull of the detected foreground pixels. The motion blob tracking 230 step then makes correspondences among the detected motion blobs across video frames, so that the motions of individual blobs can be estimated. The step finally generates motion blobs 226 along with corresponding motion vectors 236.

Figure 4:
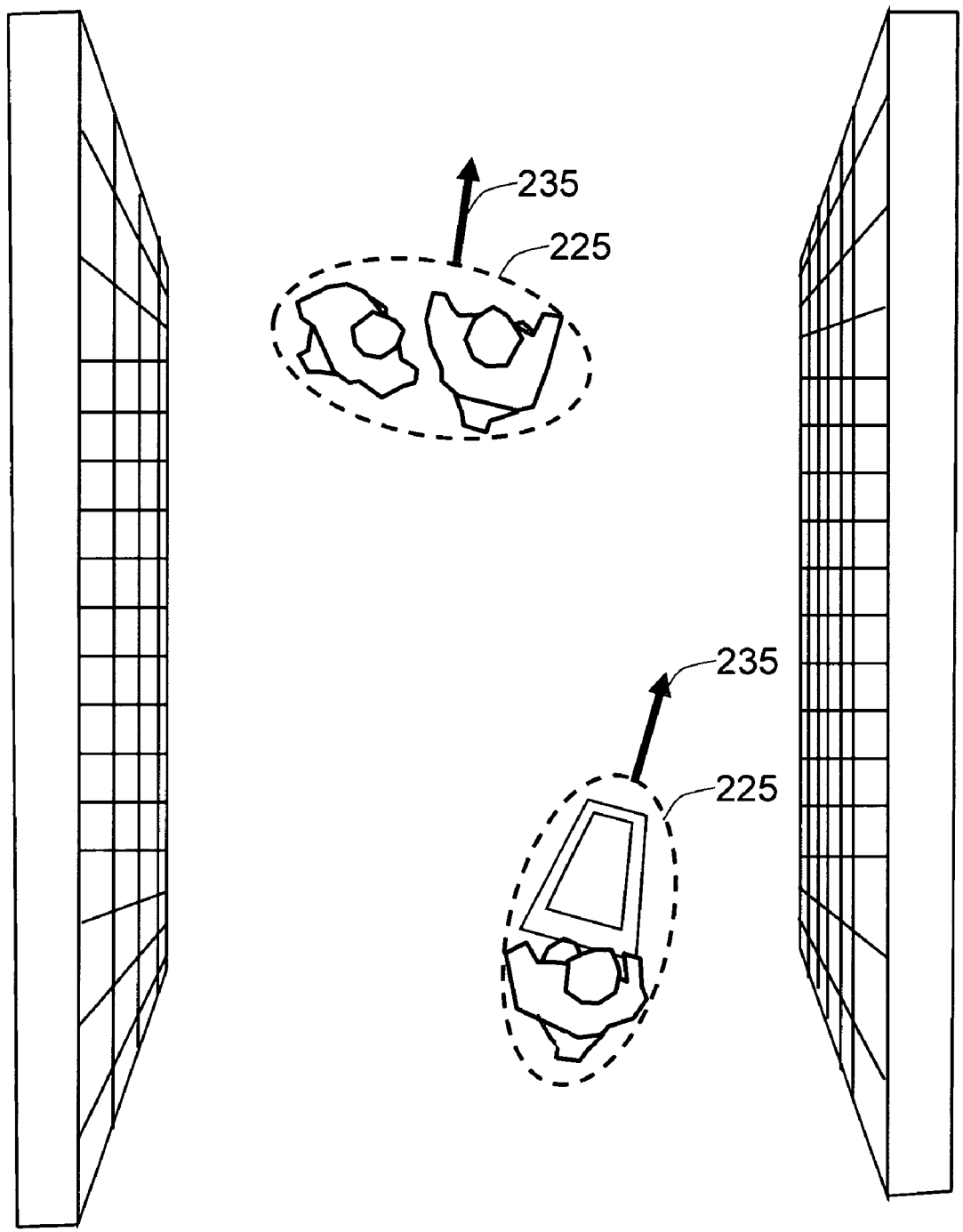
FIG. 4 shows an exemplary output from the motion blob detection and tracking step.

FIG. 4 shows exemplary outputs from the motion blob detection and tracking 200 step. In the figure, shoppers moving along an aisle are captured to input video frames 111. The motion blob detection and tracking 200 step finds motion foreground pixels 212 and groups them together as motion blobs 226. The blob on the top contains two shoppers moving together as a group. The bottom blob contains a shopper pushing a shopping cart. The dotted ellipses mark the boundaries of the motion blobs 226, and the arrows mark the motion vectors 236 of the blobs. The marked region of the blobs in the image along with the motion vectors are further processed in the next step of cart blob detection to differentiate any motion blobs with carts—called cart candidate blobs 336—from motion blobs without carts.

Figure 5:
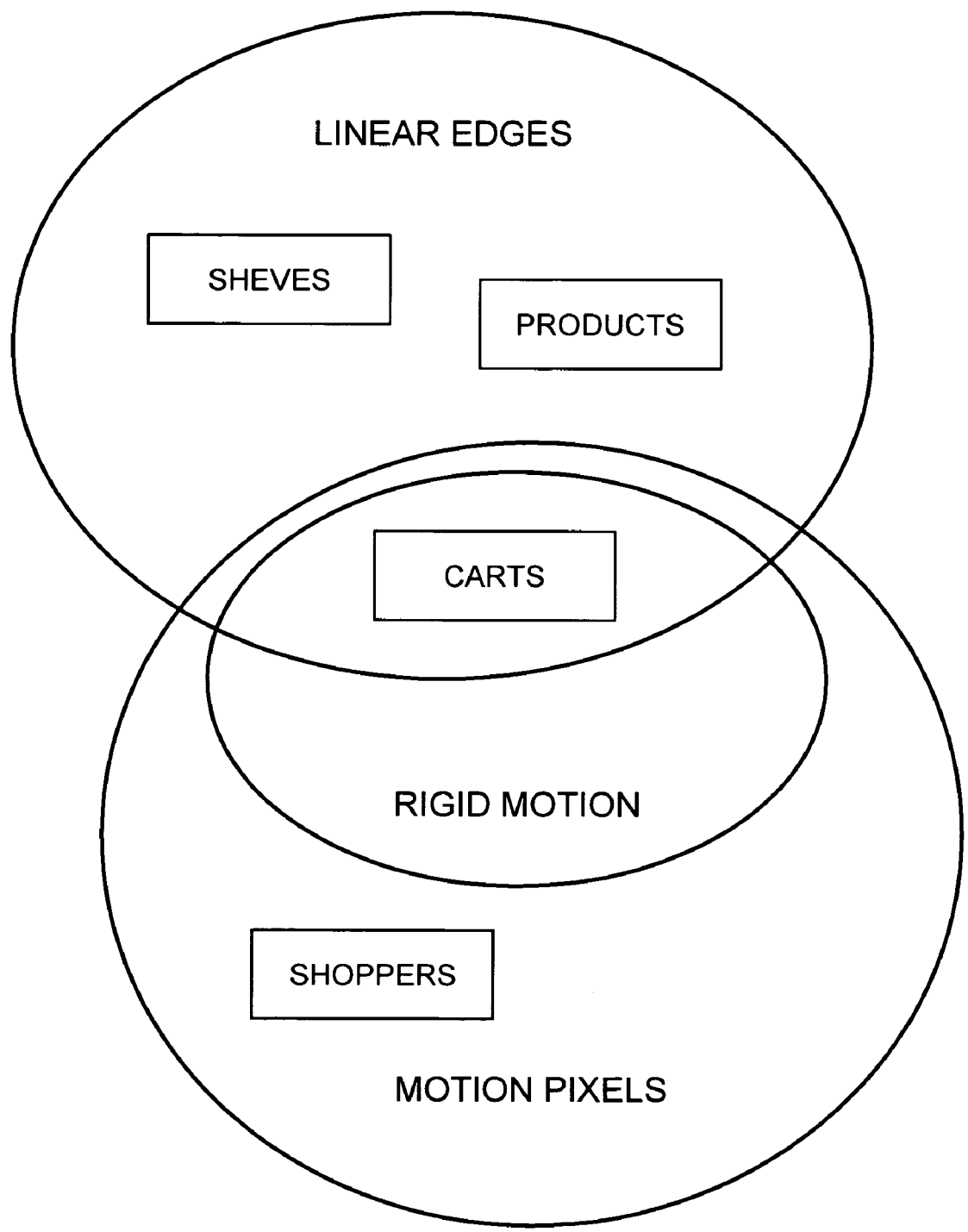
FIG. 5 shows an exemplary scheme of the cart blob detection step.

FIG. 5 shows an exemplary scheme of the cart blob detection 300 step. The scheme aims to single out cart candidate blobs 336 among detected motion blobs 226 by employing multiple measurements about the image and motion. More specifically, both the edge information and the rigid motion information are extracted from the motion blobs, and are then combined to differentiate cart blobs from other motion blobs or image structures. First, linear edges are detected from the video frames. Because the images of carts and potential products in the carts contain straight lines, cart blobs will naturally contain linear edge structures. However, store shelves or products will also generate linear edge structures in the image. Because moving carts are the objects of interest, we can deal with these unwanted image elements by using motion information; the motion pixels extracted from the motion blob detection and tracking 200 step should eliminate linear edges that belong to shelves or products. On the other hand, body images of shoppers do not have many linear edges, in general. However, linear edges from shopper images may still provide enough evidence (a predetermined threshold) so that motion blobs from shoppers without carts can be detected as cart candidate blobs. Here the rigidity of carts will provide an additional discriminating measurement—the linear edges from a cart will show very consistent motions. Cart candidate blobs 336 are identified based on the combination of these multiple criteria.

Figure 6:
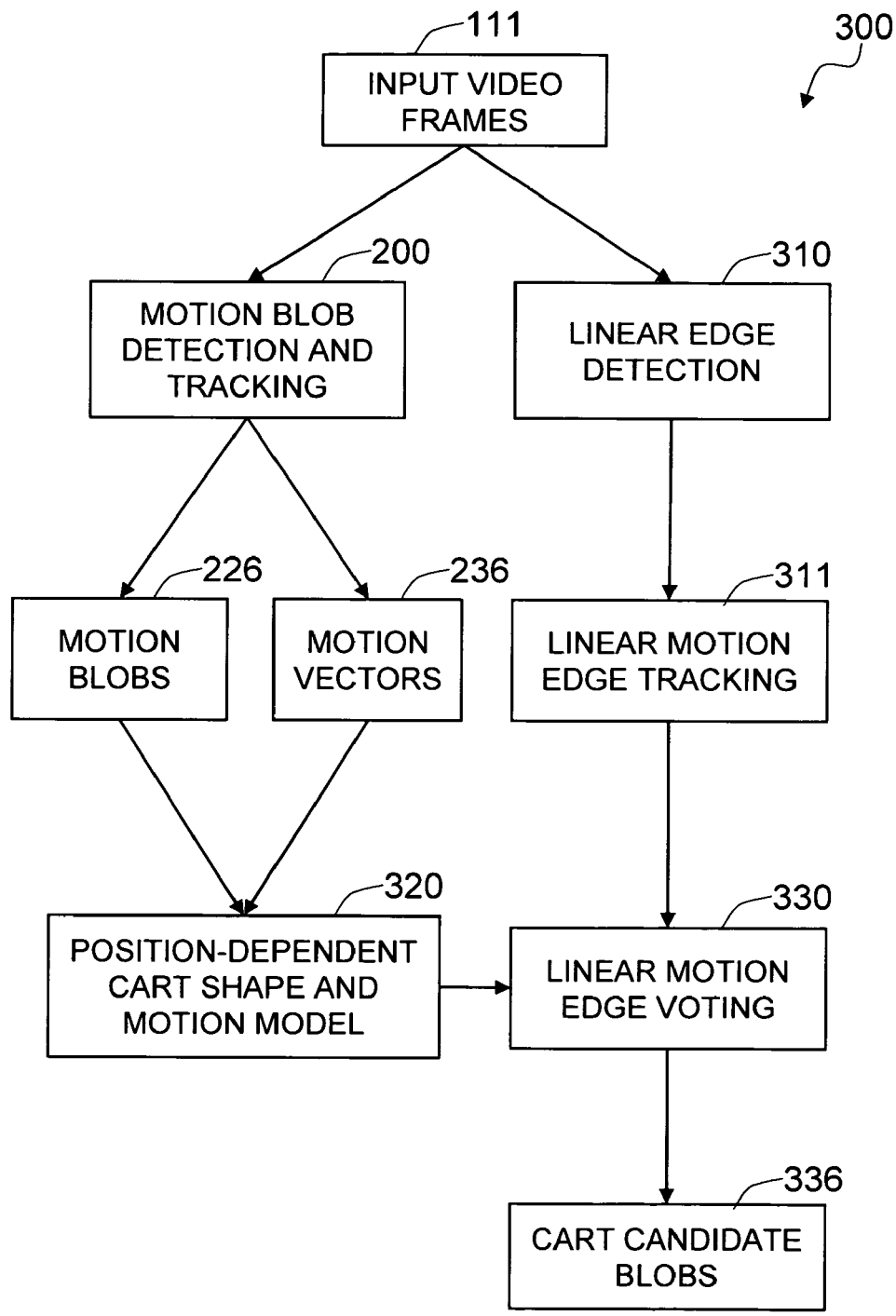
FIG. 6 is an exemplary embodiment of the cart blob detection step.

FIG. 6 is an exemplary embodiment of the cart blob detection 300 step. First, linear edges 316 are detected from input video frames 111 in the linear edge detection 310 step. A standard edge detection scheme, such as Canny's edge detection algorithm, may be used. In one of the exemplary embodiments, edge detection is performed and any set of edges that lie in a line segment are grouped together as a linear edge. Then the linear motion edge tracking 311 step examines each of the detected linear edges and determines whether some of the linear edges are in motion. If a linear edge in the current input frame 1 shows significant changes in the next frame 2, the step tries to find a matching edge in the frame 2. If there are multiple viable matches in the frame 2, then all of those motions are recorded for the motion edge. These motion edges within a motion blob along with the estimated motion vectors for each motion edge are collected, in the linear motion edge voting 330 step, to determine the presence of a cart. In this step, the motion blobs 226 along with the motion vectors 236 extracted from the motion blob detection and tracking 200 step serve to generate a position-dependent cart shape and motion model 320. The position of a motion blob provides an approximate floor position of a potential cart. The position-dependent cart shape and motion model 320 is further described in FIG. 8. If the linear motion edges belong to the cart, the motion vectors 236 can predict the approximate motions of the linear motion edges. Therefore, the position-dependent cart shape and motion model 320 generates hypotheses about the position, orientation, and motion of a cart in the motion blob in question. The linear motion edge voting 330 step collects votes for each of the hypotheses to accumulate evidences for each of the hypotheses from the tracked linear edges. If the linear motion edge voting 330 step determines that there are enough evidences, then it claims that the motions blob is highly likely to contain a cart—such motion blobs are called cart candidate blobs 336. The step can effectively localize the cart; the cart model that receives the most votes from the linear motion edges is an estimate of the cart position and orientation.

Figure 7:
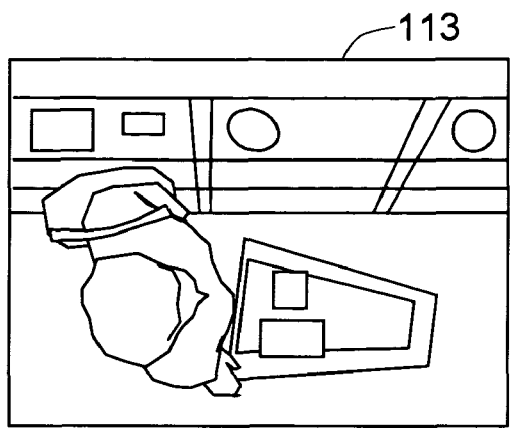
FIG. 7 shows an illustration of the cart blob detection step in an exemplary embodiment.
Figure 7:
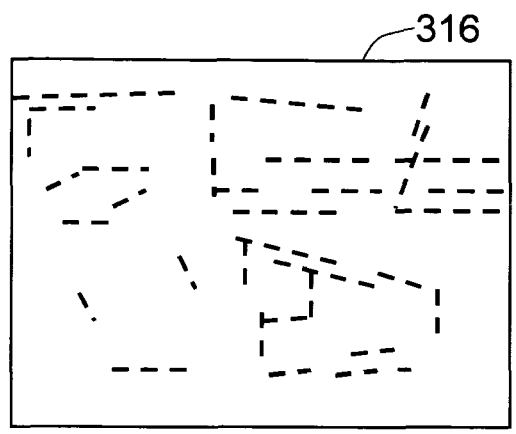
Figure 7:
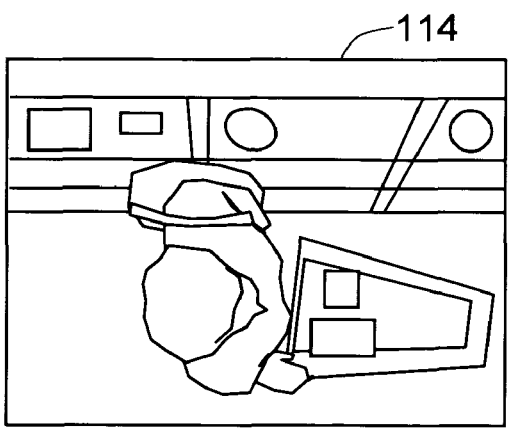
Figure 7:
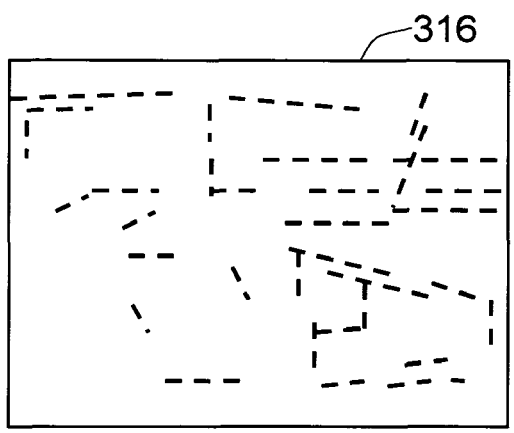
Figure 7:
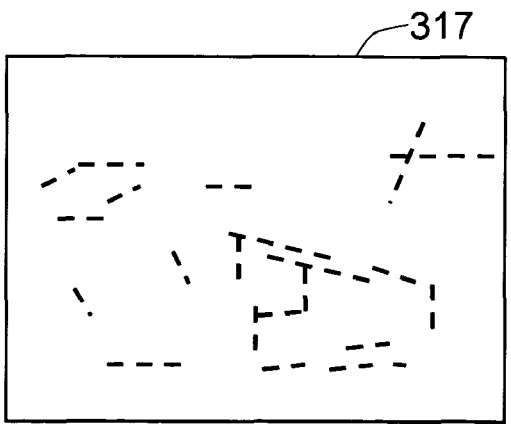
Figure 7:
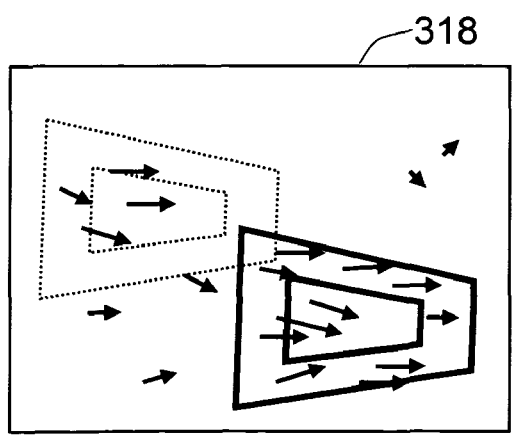

FIG. 7 shows an illustration of the cart blob detection 300 step in an exemplary embodiment. First, linear edges 316 are detected from the current input video frame 113. Then linear edges 316 are detected from the next input video frame 114 and compared to the linear edges 316 from the current input video frame 113. If some of the linear edges show significant changes, then they are classified as linear motion edges 317. The step then finds matches between the linear motion edges 317 from the current input video frame and the linear motion edges 317 from the next input video frame. The matches effectively estimate the motions of the linear motion edges 317. If the step finds more than one strong match, then all of those motions are recorded for the linear motion edge. The linear motion edge voting 330 step then computes a score for each position-dependent cart shape and motion model 320. In one of the embodiments shown in the figure, the step considers all of the motion edges within the hypothetical cart shape boundary and integrates all of the motion vectors of the linear motion edges 318 to the direction of the motion of the blob. This scheme will collect a high response from the consistent motions of the linear motion edges 318 within the cart boundary, if the blob has a cart at the hypothetical cart position. The cart model that receives the most votes is marked by thick lines and represents the correctly estimated cart position and orientation.

Figure 8:
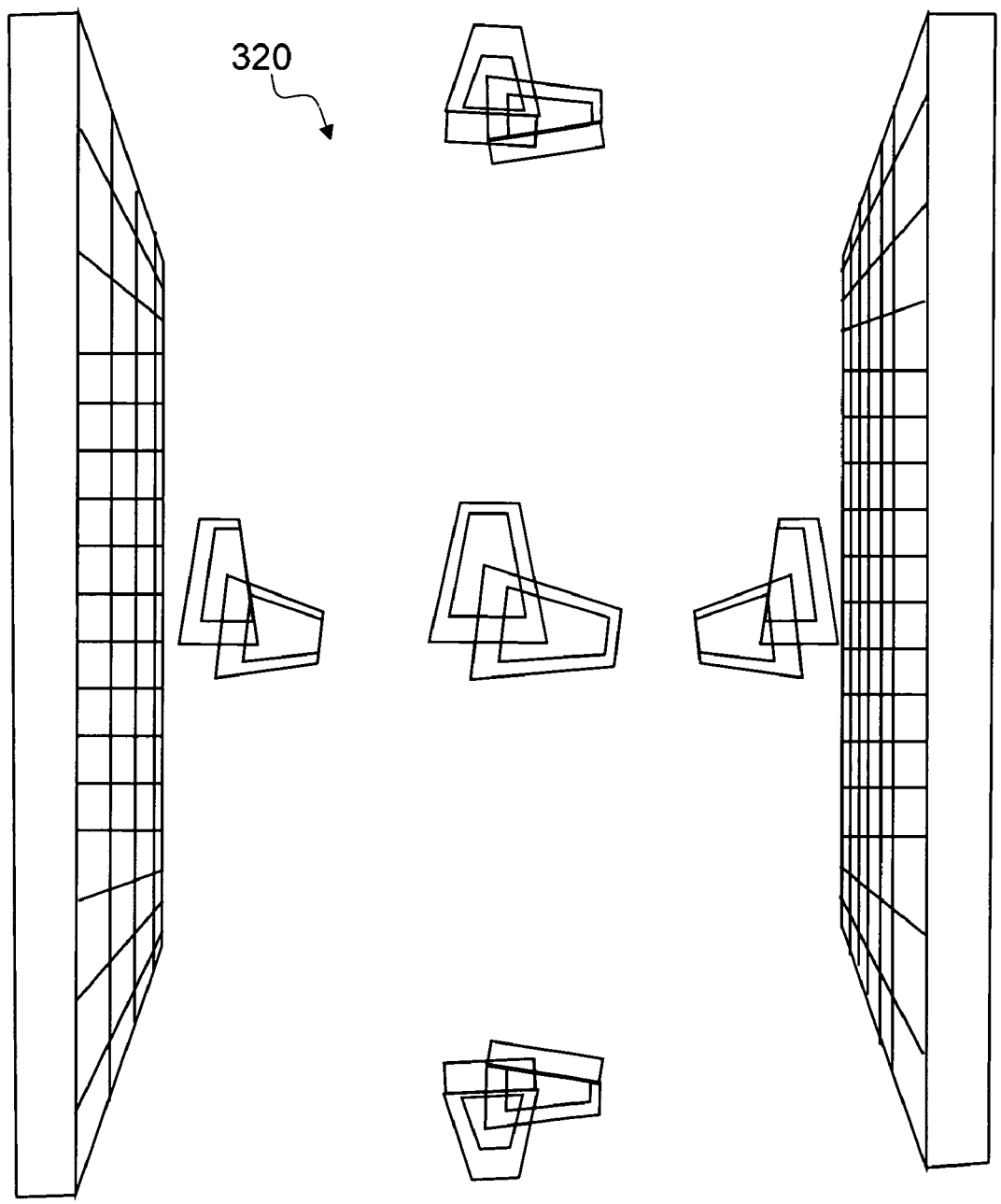
FIG. 8 shows an exemplary embodiment of the position-dependent cart shape and motion model.

FIG. 8 shows an exemplary embodiment of the position-dependent cart shape and motion model 320. Both the size and the shape of the appearance of the cart change, according to its floor position and orientation, due to the camera viewpoint changes. Because a given store has limited kinds of carts, the shape model can be generated and stored off-line, and accessed whenever it is needed. The floor position-dependent model helps to differentiate cart blobs from blobs containing only people.

Figure 9:
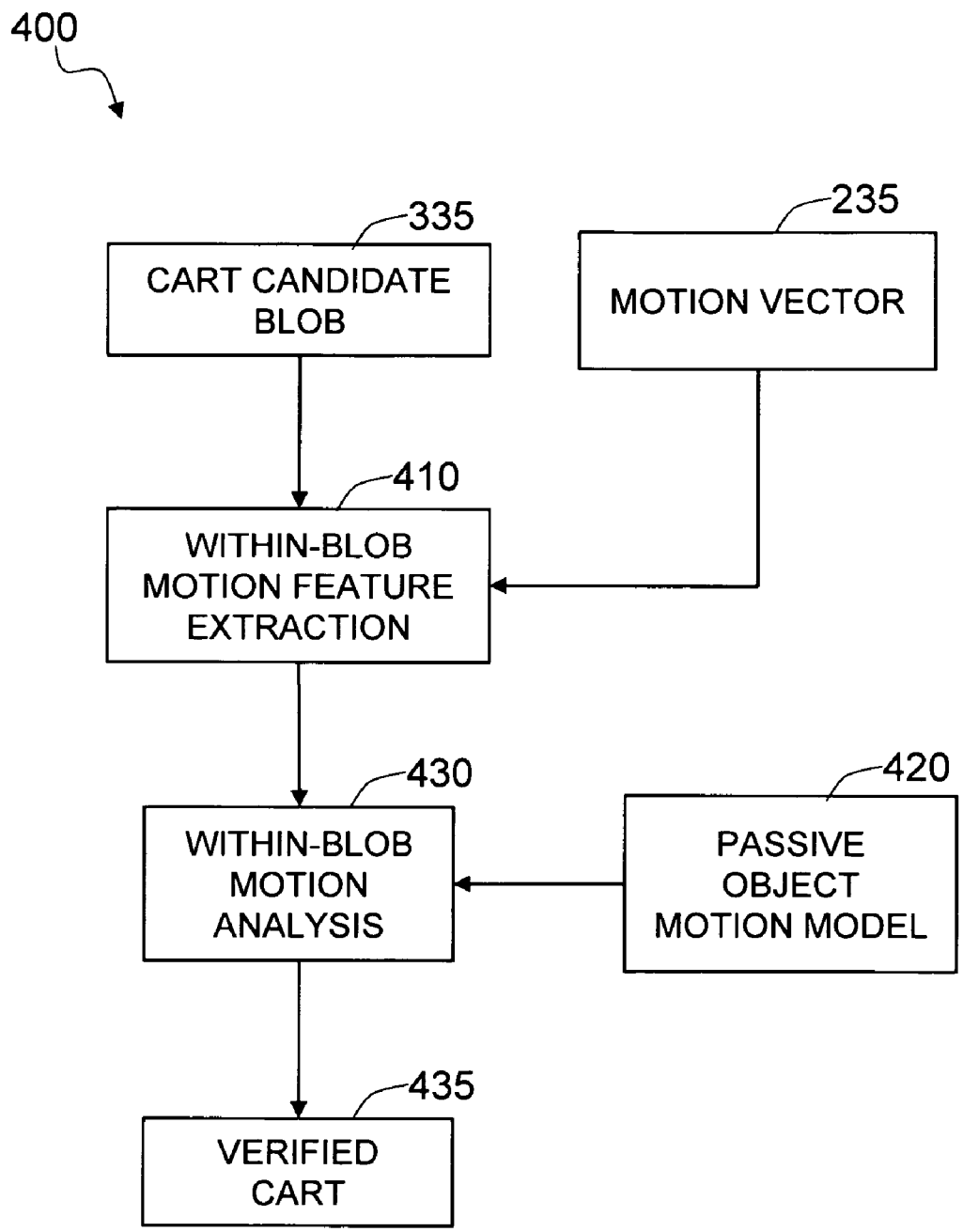
FIG. 9 shows an exemplary embodiment of the cart blob verification step.

FIG. 9 shows an exemplary embodiment of the cart blob verification 400 step. The step verifies whether or not a given cart candidate blob 335 indeed contains a cart, by utilizing a motion model that is very unique to a shopper pushing a cart. Given a cart candidate blob 335 along with the corresponding motion vector 235, the within-blob motion feature extraction 410 step computes the motion features of the blob within the blob relative to the global motion of the blob. The within-blob motion features in this step are typically collected over a longer period than in the step of cart blob detection, to accumulate enough (over a predetermined threshold) behavioral motion features of carts and shoppers. In one of the exemplary embodiments, the within-blob motion features are the motion differences among the points within the blob—the features consist of vector differences between every pair of motion vectors within the blob. In another exemplary embodiment, the within-blob motion features are represented by a histogram of the motion field 417 relative to the blob motion.

The passive object motion model 420 captures the characteristic motion features of a person pushing a cart. The within-blob motion analysis 430 then investigates whether the computed within-blob motion features reveal the characteristic motion of a passive object pushed (or pulled) by a person. If the step determines that the given cart candidate blob 335 shows such characteristic motion, then the cart candidate blob is classified as containing a cart.

In one of the exemplary embodiments, the passive object motion model 420 is the statistics of the relative motion field histogram 417. More specifically, both the distribution of the relative motion field histogram 417 of the passive motions within cart blobs and the distribution of the relative motion field histogram 417 of the motions within blobs consisting of only humans are estimated. Then the within-blob motion analysis 430 step compares the extracted histogram of the cart candidate blob to both of the distributions and determines to which distribution the motion features of the given cart candidate blob belong.

Figure 10:
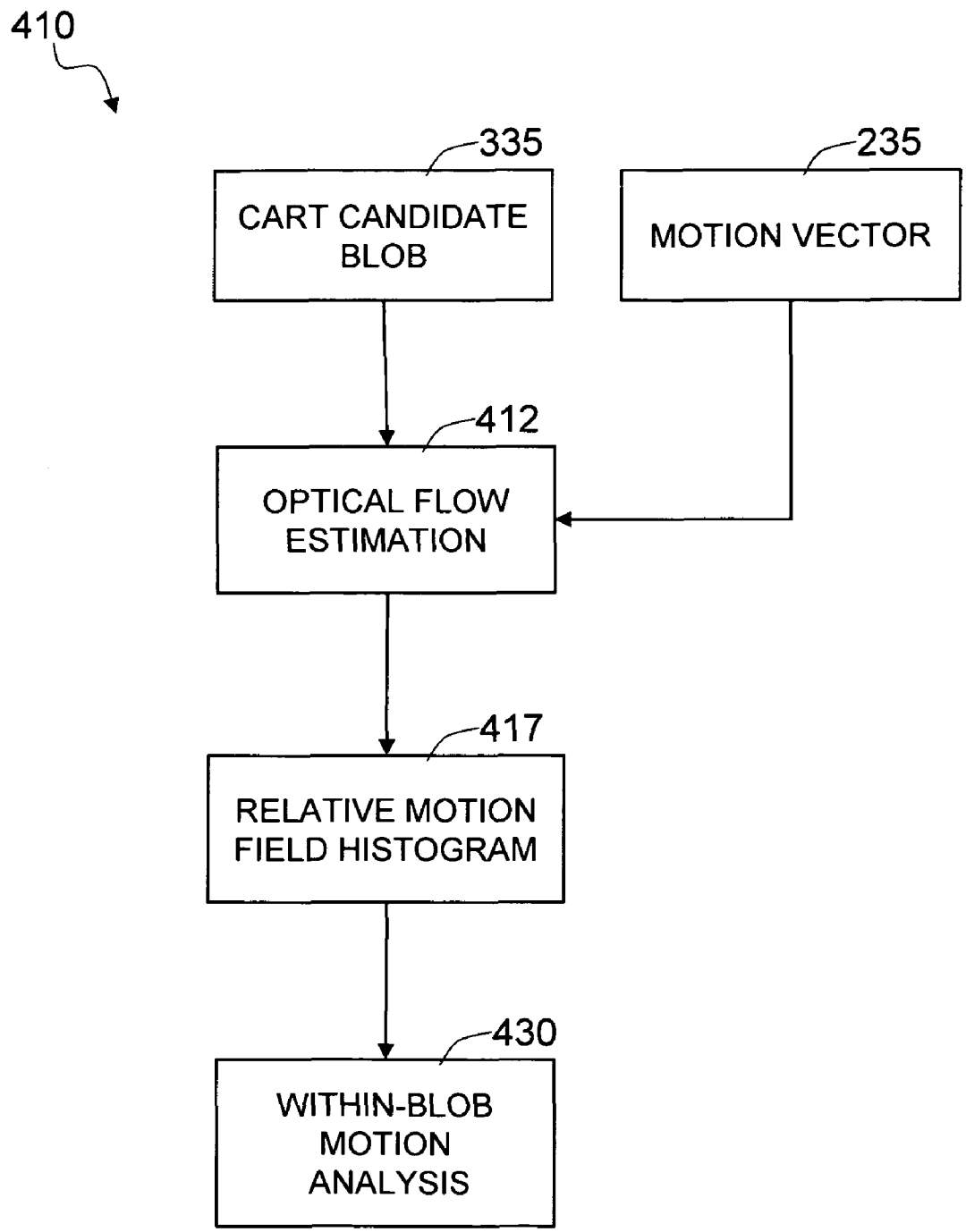
FIG. 10 shows an exemplary embodiment of the within-blob motion feature extraction step.

FIG. 10 shows an exemplary embodiment of the within-blob motion feature extraction 410 step. Given a cart candidate blob 335 along with the corresponding motion vector 235, the optical flow estimation 412 step first computes the motion vectors within the blob. Then the global motion vector of the blob is subtracted from each of these estimated motion vectors. A relative motion field histogram 417 is generated based on the relative motion vectors. The histogram is constructed on two-dimensional vector space; it captures the characteristic rigid motion of a cart and the passive motion of the cart relative to the person pushing the cart. In the simplest case, if all of the points in the blob exhibit the same motion, then the relative motion field histogram will show a single peak at zero motion 418. If the motion of the blob is non-rigid, then the histogram will reveal more diverse motions. The relative motion field histogram 417 is then examined in the within-blob motion analysis 430 step to determine whether the given blob possesses such characteristic motion features.

Figure 11:
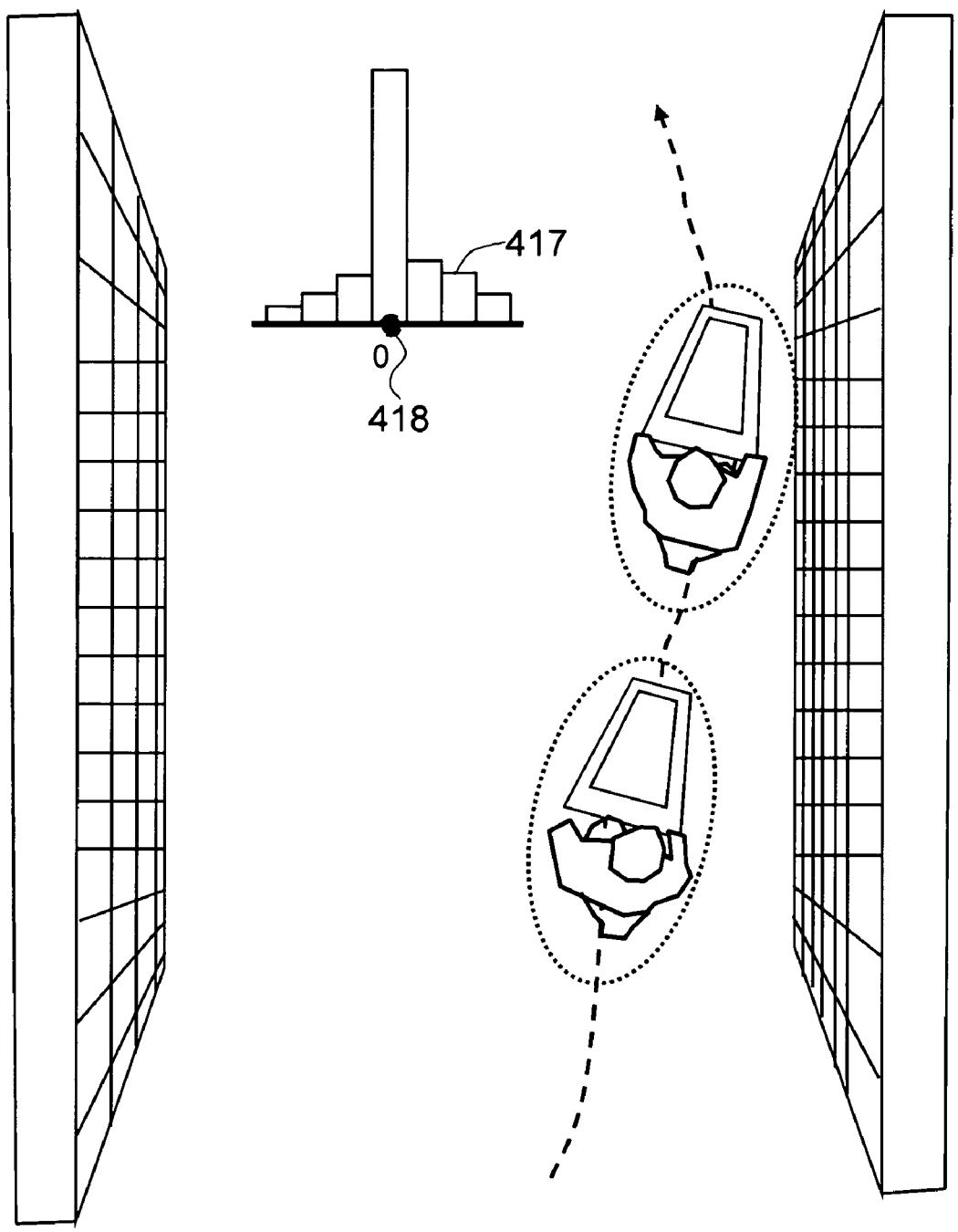
FIG. 11 shows an exemplary embodiment of the within-blob motion feature extraction and passive object motion model.

FIG. 11 shows an exemplary embodiment of the within-blob motion feature extraction 410 step and passive object motion model 420. In this embodiment, the features are the relative motion field histogram 417. When a person pushes a cart, as shown in the figure, the motion blob detection and tracking step 200 can detect the person with a cart as a single motion blob. The motions of the points in the blob will be consistent due to the straight motions; the motion of the points belonging to the cart and the products on the cart will be rigid. The motion of the points belonging to the person will be more varied, but it will still be consistent as both the cart and the person move in approximately the same direction and at the same speed. The relative motion field histogram 417 reflects such observation; consistent rigid motion produces a sharp peak at the zero motion 418 and the rest of the non-rigid motion of the person's body contributes to the smaller amounts of motions. The histogram shows very little occurrence of large motions. The histogram is shown in one dimension for a clear presentation.

Figure 12:
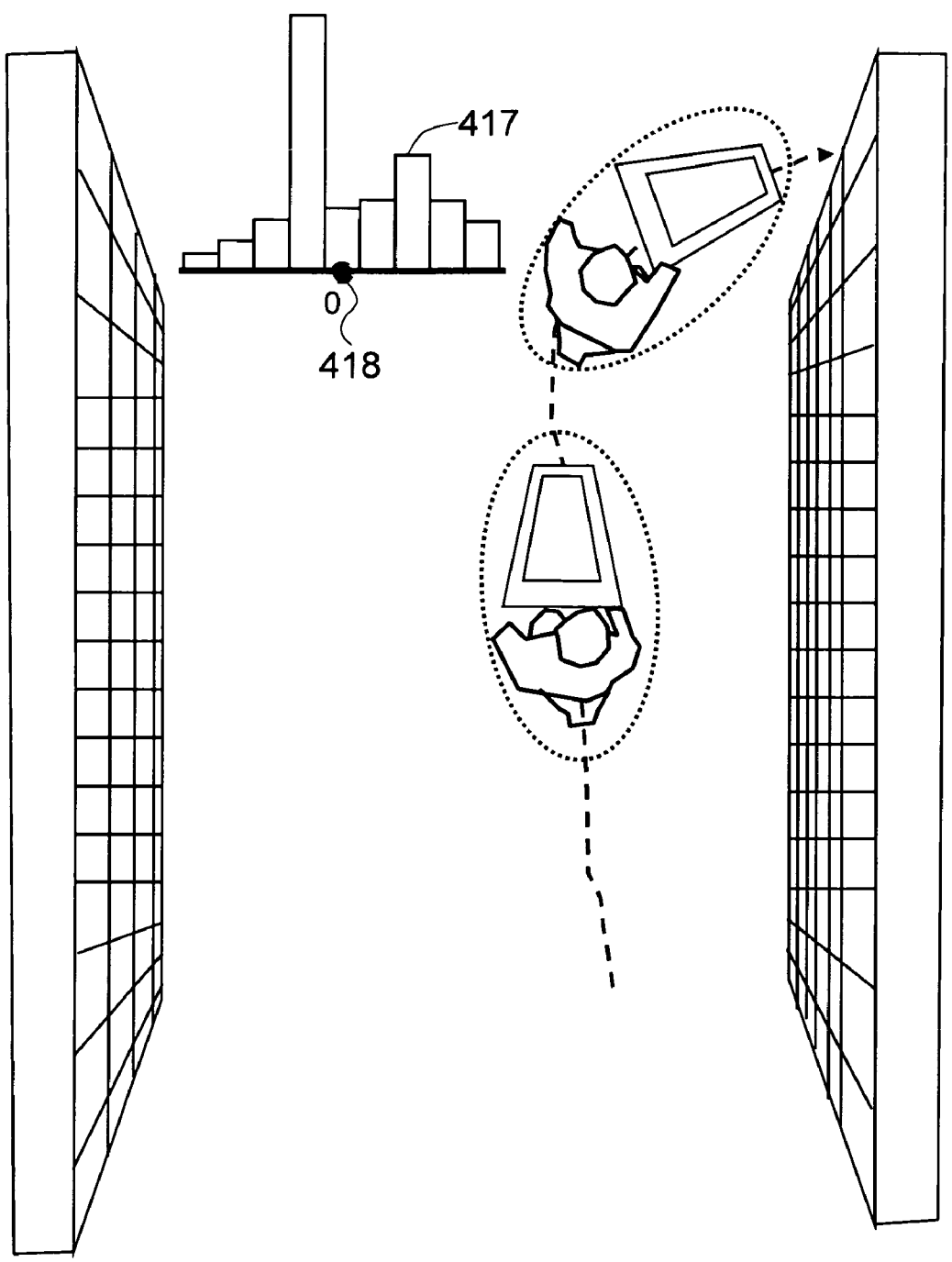
FIG. 12 shows an exemplary embodiment of the within-blob motion feature extraction and passive object motion model.

FIG. 12 shows an exemplary embodiment of the within-blob motion feature extraction 410 step and passive object motion model 420. In this embodiment, the features are the relative motion field histogram 417. When a person pushes a cart toward the next aisle, as shown in the figure, the motion blob detection and tracking 200 step can detect the person with the cart as a single motion blob. The motions of the points in the blob will be less consistent than the motions of the blob moving in the same direction; however, the motion histogram will still reveal a distinct structure. The motion of the points belonging to the cart and the products on the cart will be rigid. The motion vector of the points belonging to the person will be more varied. Because the motion of the cart and the motion of the person are slightly different, the relative motion field histogram splits the motion of the cart and the motion of the person away from the zero motion 418. The rigid motion of the cart produces a sharp peak left of the zero motion 418 and the non-rigid motion of the person's body contributes to the smaller bell-shaped peak to the right of the zero motion 418. The histogram is shown in one dimension for a clear presentation.

Figure 13:
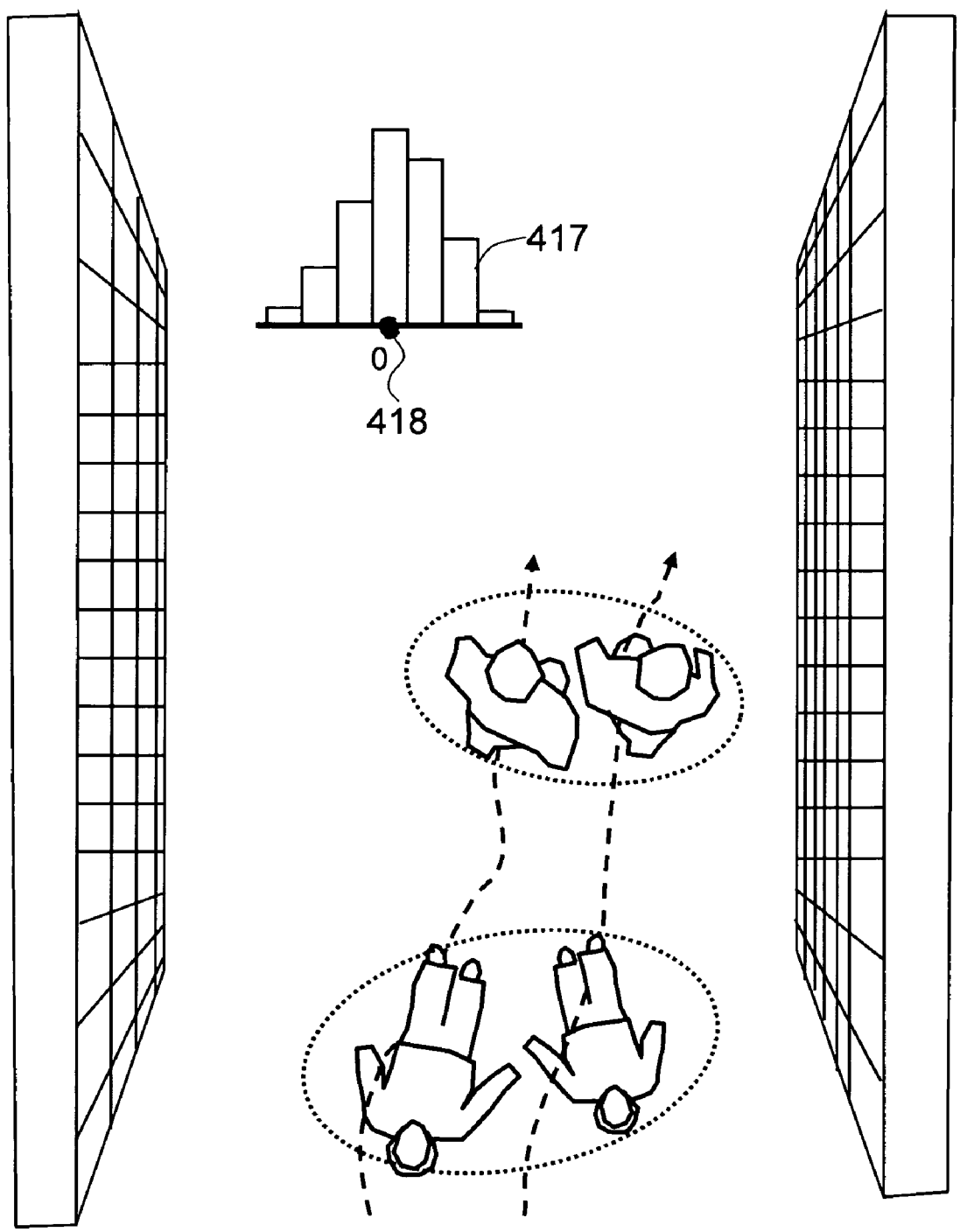
FIG. 13 shows an exemplary embodiment of the within-blob motion feature extraction step.

FIG. 13 shows an exemplary embodiment of the within-blob motion feature extraction 410 step. In this embodiment, the features are the relative motion field histogram 417. When two shoppers walk together, as shown in the figure, the motion blob detection and tracking 200 step can detect the two shoppers as a single motion blob. The motions of the points in the blob will be varied, because the motion of the human body is highly non-rigid. Therefore, when the average motion of the blob is subtracted from the motion vectors, the histogram will not show a distinct peak. Instead, the histogram has a flat bell-shape. This is one of the distinct features of the motion field that differentiates the cart blob from the blob containing only humans. The histogram is shown in one dimension for a clear presentation.

Figure 14:
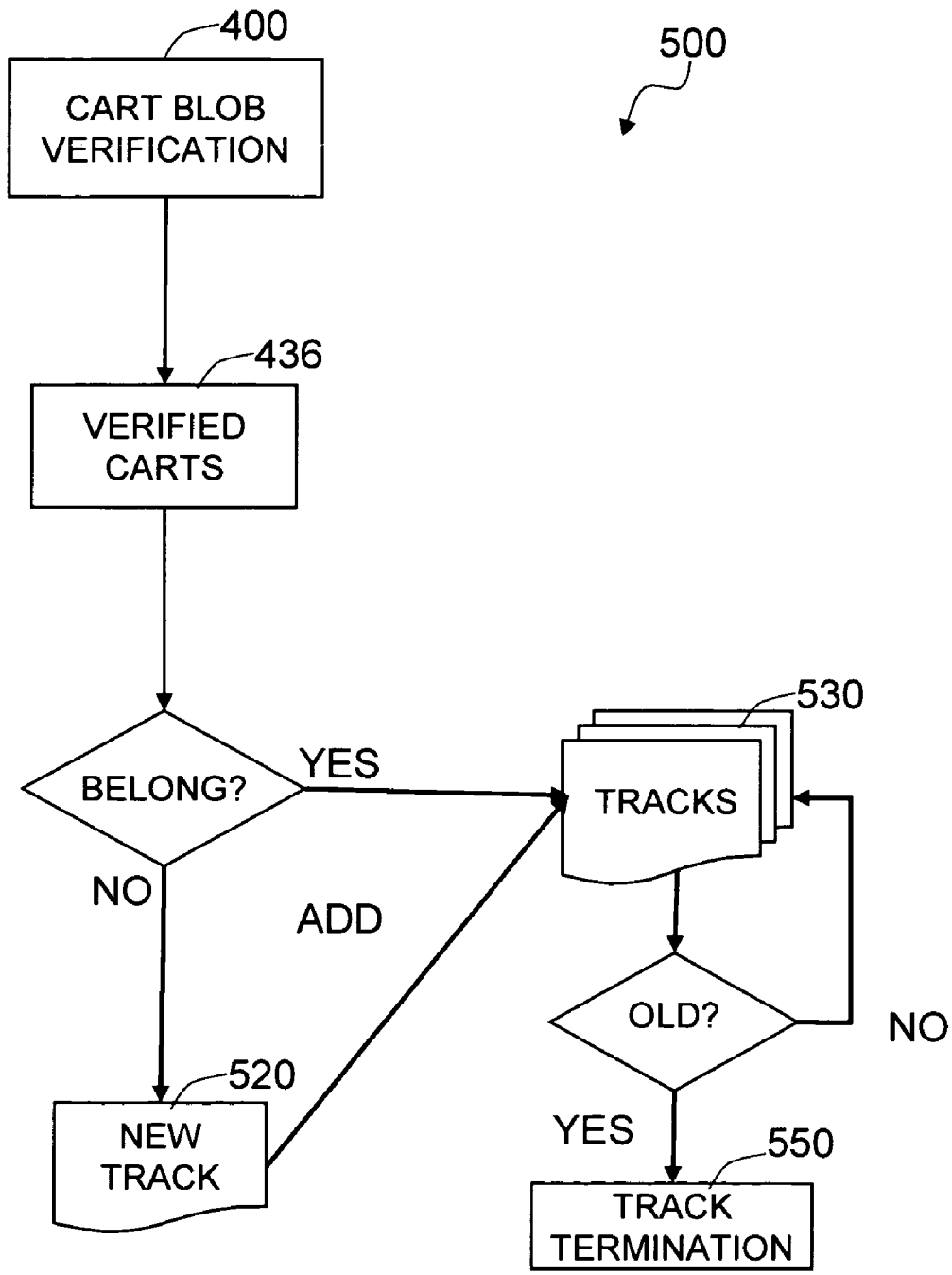
FIG. 14 shows an exemplary embodiment of the cart tracking step.

FIG. 14 shows an exemplary embodiment of the cart tracking 500 step. The cart tracker 510 generates a new track 520 when a new cart (with a shopper) is detected in the view, assigns detected carts to existing tracks 530 to keep identities of carts in the scene, and terminates a track 550 when a cart is out of the scene. When new carts are detected in the current input video frame 111, the cart tracker 510 constructs a table of the new carts and the existing tracks. Then it computes the positional match score of each (cart, track) pair that measures the likelihood of the given cart belonging to the given track. The match score considers the positions and the orientations of the carts. If the score of a pair is below a predetermined threshold, the pair is excluded from the table. The pair having the highest score gets the assignment: cart→track. This procedure is repeated until all of the carts are assigned to matching tracks. However, if there is a new shopper pushing a cart in the scene, the cart should not have a match with one of existing tracks. In that case, the threshold should exclude those matches, and the cart should remain in the queue. The cart then generates a new track 438, and the track is added to the list of tracks 530.

For every frame, if a certain track does not have a new cart for more than a certain time period, the cart tracker 510 terminates the track 446. In one of the exemplary embodiments, the cart tracker 510 runs parallel to the shopper tracker so that the two trackers exchange information. For example, if a shopper leaves a cart for a predetermined period of time to interact with products, the cart track will be dormant for the same amount of time. However, since the shopper's movement will keep the shoppers' track alive, the cart belonging to the person will not be removed from the list of tracks 530.

Figure 15:
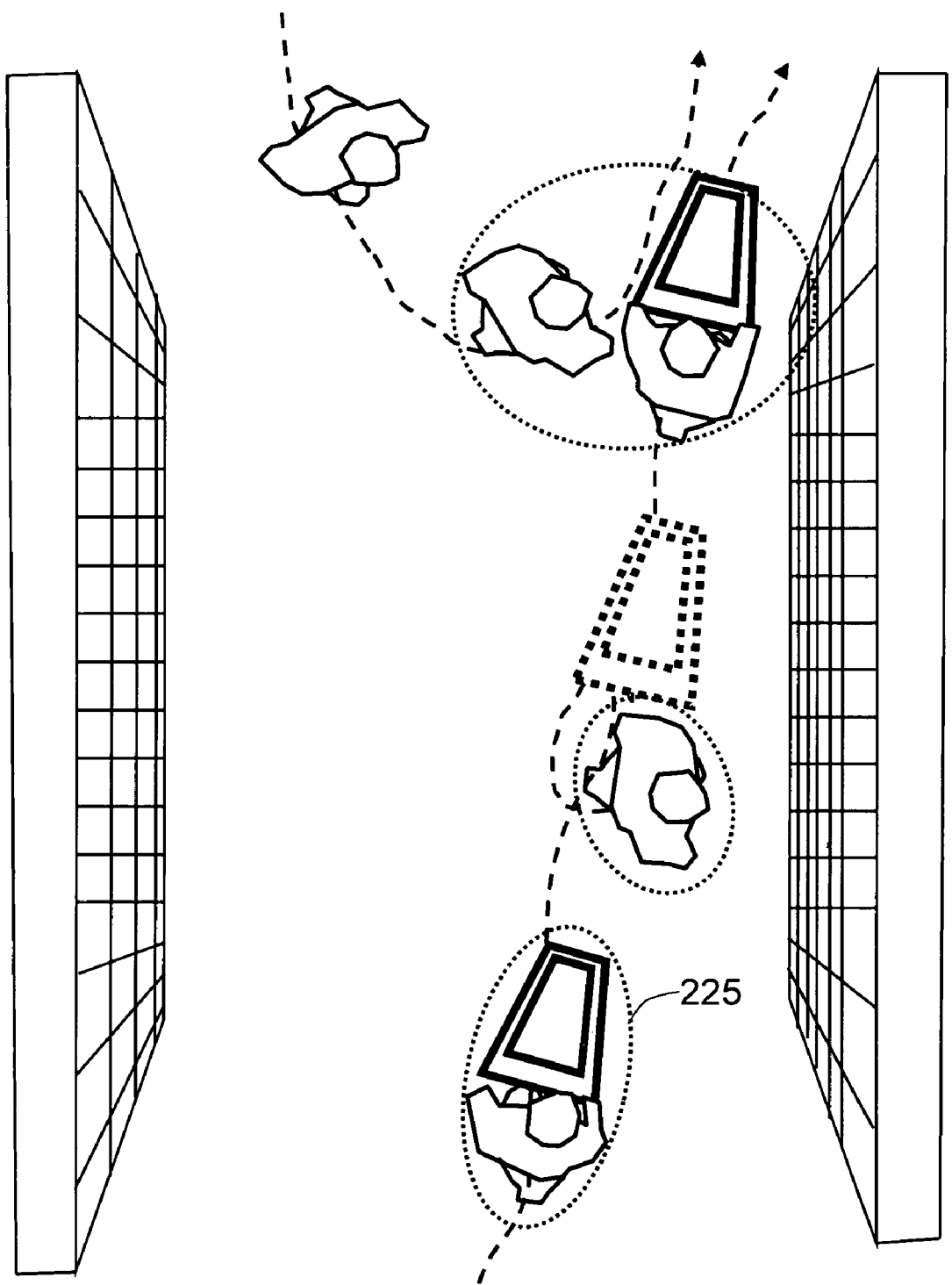
FIG. 15 shows an exemplary scenario of the cart tracking step.

FIG. 15 shows an exemplary scenario of the cart tracking 500 step. The detected motion blobs are marked by dotted ellipses, and the detected carts are marked by thick lines. When a shopper pushing a cart enters the aisle, the cart blob detection 300 and cart blob verification 400 steps find and identify the shopping cart within the motion blob 225. Once the shopper reaches the intended shelf space, he or she leaves the cart in one place and interacts with products on the shelf. Because the cart does not go through any motion, only the shopper gets tracked. However, the cart tracker algorithm keeps the position of the cart in the record, so that it can later resume the tracking once the shopper moves the cart. The cart position and orientation kept by the tracker is marked with dotted lines. When the shopper now pushing the cart is joined by a fellow shopper (such as a household member), the cart blob detection step finds a bigger motion blob that contains both the shoppers and the cart. If the cart blob verification 400 step successfully confirms the presence of a cart, then the cart tracker 500 algorithm can continue the tracking of the cart. It is not the responsibility of the cart blob detection 300 step or the cart blob verification 400 step to find shoppers in the cart blob. As long as the correct cart is identified, the cart tracker can generate a correct track of the cart.

While the above description contains much specificity, these should not be construed as limitations on the scope of the invention, but as exemplifications of the presently preferred embodiments thereof. Many other ramifications and variations are possible within the teachings of the invention.

Thus, the scope of the invention should be determined by the appended claims and their legal equivalents, and not by the examples given.

What is claimed is:

1. A method for detecting and tracking shopping carts, utilizing a position-dependent cart shape and motion model based on video images, comprising the following steps of:
   a) detecting and tracking motion blobs from the video images, wherein pixels within the same motion blob go through the same motion,
   b) detecting presence of carts within the detected motion blobs by collecting evidence from motions of pixels within the detected motion blobs,
   c) constructing a motion model of carts that characterizes the motion of passive objects pushed by humans,
   d) extracting motion features that characterize the motion of passive object by constructing a histogram of relative motions among points within the motion blobs,
   e) verifying presence of carts in the detected motion blobs based on the motion model of carts, and
   f) tracking the verified carts so that their individual identities can be maintained across the video images,
   wherein the histogram captures characteristic rigid motion of a cart and passive motion of the cart relative to a person pushing the cart.

2. The method according to claim 1, wherein the method further comprises a step of detecting the motion blobs by detecting and aggregating motion foreground pixels according to the proximities among the motion foreground pixels.

3. The method according to claim 1, wherein the method further comprises a step of detecting the presence of carts by testing each hypothesis about cart presence at a certain position and orientation,
   wherein the hypotheses about cart positions and orientations are determined by the positions and motions of the detected motion blobs.

4. The method according to claim 1, wherein the method further comprises a step of collecting the evidence by finding linear edges in the motion blobs that are moving and by collecting votes from the linear edges.

5. The method according to claim 1, wherein the method further comprises a step of constructing the motion model of carts by estimating a distribution of the motion features within the motion blobs that contain carts.

6. The method according to claim 5, wherein the method further comprises a step of constructing the motion model of carts by estimating a distribution of the motion features within the motion blobs that only contain humans.

7. The method according to claim 1, wherein the method further comprises a step of tracking the verified carts by maintaining and updating a list of cart tracks,
   wherein the matches between the detected carts and the cart tracks in the list of cart tracks are found by comparing positions and orientations of the verified carts and the position and orientation of the last cart in each list of cart tracks.

8. The method according to claim 7, wherein the method further comprises a step of maintaining the presence of carts that are not in motion by detecting the presence of human figures near the carts.

9. An apparatus for detecting and tracking shopping carts, utilizing a position-dependent cart shape and motion model based on video images, comprising:
   a) means for detecting and tracking motion blobs from the video images, wherein pixels within the same motion blob go through the same motion,
   b) means for detecting presence of carts within the detected motion blobs by collecting evidence from motions of pixels within the detected motion blobs,
   c) means for constructing a motion model of carts that characterizes the motion of passive objects pushed by humans,
   d) means for extracting motion features that characterize the motion of passive object by constructing a histogram of relative motions among points within the motion blobs,
   e) means for verifying presence of carts in the detected motion blobs based on the motion model of carts, and
   f) means for tracking the verified carts so that their individual identities can be maintained across the video images,
   wherein the histogram captures characteristic rigid motion of a cart and passive motion of the cart relative to a person pushing the cart.

10. The apparatus according to claim 9, wherein the apparatus further comprises means for detecting the motion blobs by detecting and aggregating motion foreground pixels according to the proximities among the motion foreground pixels.

11. The apparatus according to claim 9, wherein the apparatus further comprises means for detecting the presence of carts by testing each hypothesis about cart presence at a certain position and orientation,
    wherein the hypotheses about cart positions and orientations are determined by the positions and motions of the detected motion blobs.

12. The apparatus according to claim 9, wherein the apparatus further comprises means for collecting the evidence by finding linear edges in the motion blobs that are moving and by collecting votes from the linear edges.

13. The apparatus according to claim 9, wherein the apparatus further comprises means for constructing the motion model of carts by estimating a distribution of the motion features within the motion blobs that contain carts.

14. The apparatus according to claim 13, wherein the apparatus further comprises means for constructing the motion model of carts by estimating a distribution of the motion features within the motion blobs that only contain humans.

15. The apparatus according to claim 9, wherein the apparatus further comprises means for tracking the verified carts by maintaining and updating a list of cart tracks,
    wherein the matches between the detected carts and the cart tracks in the list of cart tracks are found by comparing positions and orientations of the verified carts and the position and orientation of the last cart in each list of cart tracks.

16. The apparatus according to claim 15, wherein the apparatus further comprises means for maintaining presence of carts that are not in motion by detecting presence of human figures near the carts.

* * * * *